(12) United States Patent
Purcell et al.

(10) Patent No.: US 8,984,183 B2
(45) Date of Patent: Mar. 17, 2015

(54) SIGNALING, ORDERING, AND EXECUTION OF DYNAMICALLY GENERATED TASKS IN A PROCESSING SYSTEM

(75) Inventors: Timothy John Purcell, Provo, UT (US); Lacky V. Shah, Los Altos Hills, CA (US); Jerome F. Duluk, Jr., Palo Alto, CA (US); Sean J. Treichler, Sunnyvale, CA (US); Karim M. Abdalla, Menlo Park, CA (US); Philip Alexander Cuadra, San Francisco, CA (US); Brian Pharris, Cary, NC (US)

(73) Assignee: Nvidia Corporation, Santa Clara, CA (US)

( * ) Notice: Subject to any disclaimer, the term of this patent is extended or adjusted under 35 U.S.C. 154(b) by 407 days.

(21) Appl. No.: 13/329,169

(22) Filed: Dec. 16, 2011

(65) Prior Publication Data

US 2013/0160021 A1    Jun. 20, 2013

(51) Int. Cl.
*G06F 3/00* (2006.01)
*G06F 9/46* (2006.01)
*G06F 9/48* (2006.01)

(52) U.S. Cl.
CPC .................... *G06F 9/4843* (2013.01)

USPC ............................................. 710/39; 718/100

(58) Field of Classification Search
None
See application file for complete search history.

(56) References Cited

U.S. PATENT DOCUMENTS

| | | | | |
|---|---|---|---|---|
| 5,438,680 A | * | 8/1995 | Sullivan | ......................... 718/100 |
| 2009/0282407 A1 | * | 11/2009 | Hayashi | ......................... 718/100 |

* cited by examiner

*Primary Examiner* — Hyun Nam
(74) *Attorney, Agent, or Firm* — Artegis Law Group, LLP

(57) ABSTRACT

One embodiment of the present invention sets forth a technique for enabling the insertion of generated tasks into a scheduling pipeline of a multiple processor system allows a compute task that is being executed to dynamically generate a dynamic task and notify a scheduling unit of the multiple processor system without intervention by a CPU. A reflected notification signal is generated in response to a write request when data for the dynamic task is written to a queue. Additional reflected notification signals are generated for other events that occur during execution of a compute task, e.g., to invalidate cache entries storing data for the compute task and to enable scheduling of another compute task.

19 Claims, 10 Drawing Sheets

SIGNALING, ORDERING, AND EXECUTION OF DYNAMICALLY GENERATED TASKS IN A PROCESSING SYSTEM

BACKGROUND OF THE INVENTION

1. Field of the Invention

The present invention generally relates to execution of compute tasks and more specifically to the signaling, ordering, and execution of dynamically generated tasks in a processing system.

2. Description of the Related Art

Conventionally tasks to be processed in a multiple processor system are all received from a single input stream. If a first task were to generate data to be processed by a second task, the second task is also received from the single input stream and the insertion of the second task into the single input stream is performed by a central processing unit (CPU) that is separate from the multiple processor system.

To perform the insertion, the CPU must be informed that the second task is ready to be processed and provided with the location of where the second task is stored. Processing of the second task incurs additional latency due to delays resulting from the communication needed between the multiple processor system executing the first task and the CPU.

Accordingly, what is needed in the art is a system and method for enabling the insertion of generated tasks into a scheduling pipeline of a multiple processor system without involvement of the CPU.

SUMMARY OF THE INVENTION

A system and method for enabling the insertion of generated processing tasks into a scheduling pipeline of a multiple processor system does without intervention by a CPU. When a compute task that is being executed dynamically generates a dynamic task, and writes entries of a queue in memory where data for the dynamic task is stored, a reflected notification signal is generated and transmitted directly to a scheduling unit of the multiple processor system without intervention by a CPU. The reflected notification signal that is transmitted includes information corresponding to a write request that stores data in the queue. Additional signals are generated during execution of a compute task and transmitted directly to the scheduling unit in response to other events, e.g., to initiate processing of a dynamic task, to invalidate cache entries storing data for the compute task, and to enable scheduling of another compute task.

Various embodiments of a method of the invention for notifying a task manager that data is available for processing include generating a first notification signal that is transmitted to the task manager, where the notification signal comprises a first offset and a first delta value. First data that is associated with the first offset and the first delta value is stored in a queue corresponding to a first processing task. A second notification signal is generated and transmitted to the task manager, where the notification signal comprises a second offset and a second delta value. Second data that is associated with the second offset and the second delta value is stored in the queue corresponding to the first processing task. The first notification signal and a second notification signal are received and the task manager determines if the first offset and the first delta value can be coalesced with the second offset and second delta value to generate a coalesced offset and a coalesced delta value. The task manager schedules processing of at least one of the first data and the second data for the first processing task in a processing cluster array.

Various embodiments of the invention include a system for notifying a task manager that data is available for processing comprises a queue, a memory management unit, and a task manager. The queue corresponding to a first processing task and that is configured to store the data, including first data and second data. The memory management unit is configured to generate a first notification signal that is transmitted directly to the task manager, where the notification signal specifies a first offset and a first delta value associated with the first data and generate a second notification signal that is transmitted directly to the task manager, where the notification signal specifies a second offset and a second delta value associated with the second data. The task manager is configured to receive the first notification signal and the second notification signal, determine if the first offset and the first delta value can be coalesced with the second offset and the second delta value to generate a coalesced offset and a coalesced delta value, and schedule processing of at least one of the first data and the second data for the first processing task in a processing cluster array.

Additionally, entries of the dynamic task queue may be written out of order compared with the order in which entries in the dynamic task queue are allocated to threads generating the data for the dynamic task. Therefore, when data that is dynamically generated by the threads is written to the queue, sequential entries of the queue that have been written are tracked and the scheduling unit is notified when a sequence of entries at the front of the queue has been written and may be scheduled for processing to begin (or continue) execution of the dynamic task. Decoupling the allocation of entries to the threads executing the compute task that generates data for the dynamic task from writing of the entries by the different threads, allows the threads that generate the data to simply write the entries and then exit or continue processing other data. Therefore, the threads do not have to write the queue in the same order as the threads receive allocations of entries. However, the tracking and notification of the scheduling unit when sequences of entries are ready to be scheduled allows the data to be processed as soon as possible.

Importantly, communication with the CPU is not needed to do the following: (a) notify the CPU when data for a dynamic task is ready to be processed, (b) to invalidate cache entries, or (c) to enable scheduling of another compute task. Therefore, when compared with systems that require intervention by the CPU, latencies are reduced for: (a) scheduling processing of dynamic task data, (b) invalidation of cache entries, and (c) enabling scheduling of another compute task.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Processing units communicate directly with a task management unit without intervention by a CPU and without inserting instructions into a push buffer. When the processing units execute compute tasks and dynamically generate child tasks, the processing units notify the task management unit when data for the child tasks is available to be processed. The task management unit then schedules the child task for execution by inserting the child task into a list of tasks. The direct communication between the processing units and the task management unit minimizes delays incurred between the time that the child task data is generated and when processing of the child task data is scheduled.

System Overview

Figure 1:
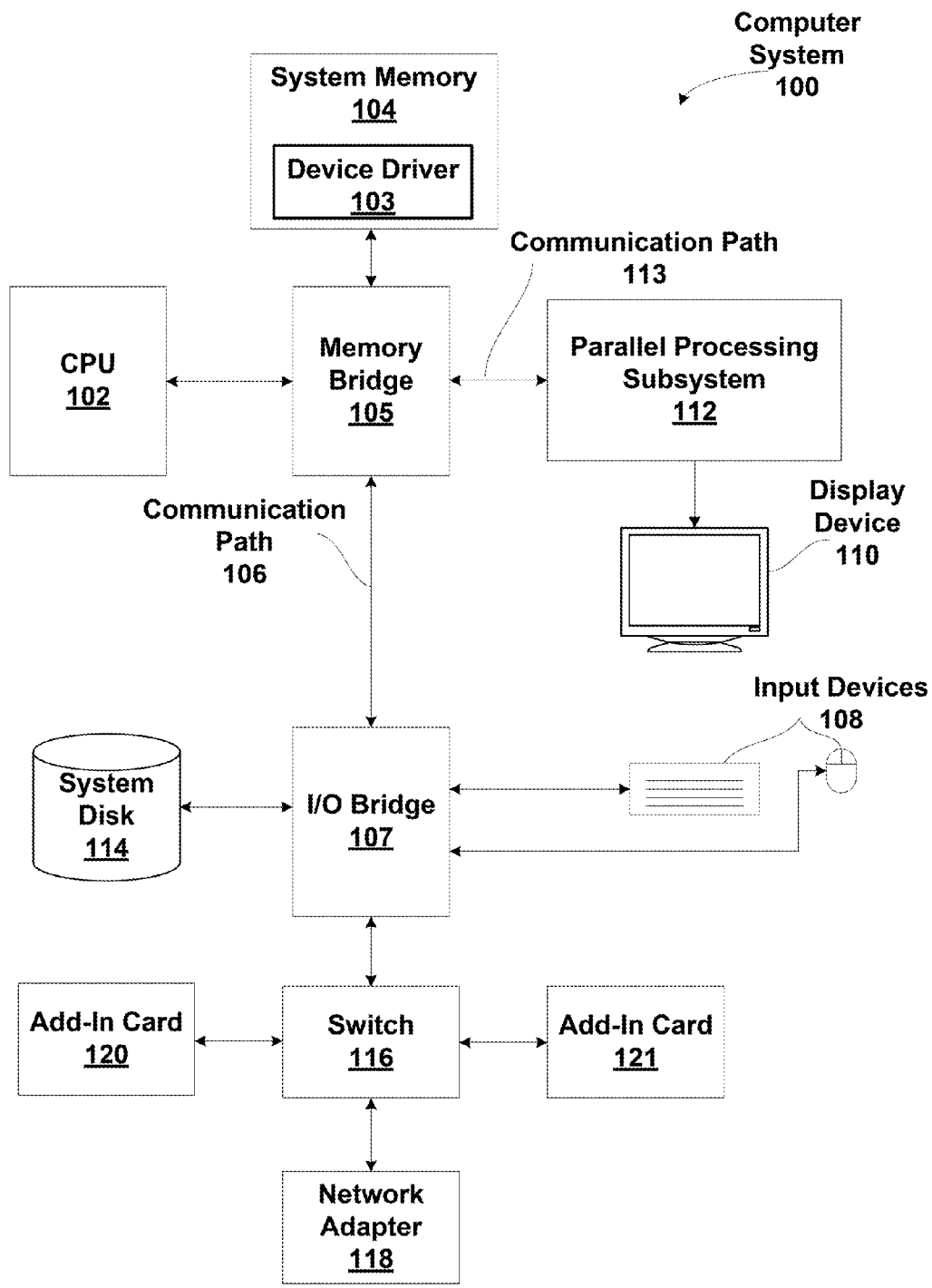
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. The various communication paths shown in FIG. 1, including the specifically named communication paths 106 and 113, may be implemented using any suitable protocols, such as PCI (Peripheral Component Interconnect), PCI-Express, AGP (Accelerated Graphics Port), HyperTransport, or any other bus or point-to-point communication protocol(s), and connections between different components may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete components. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
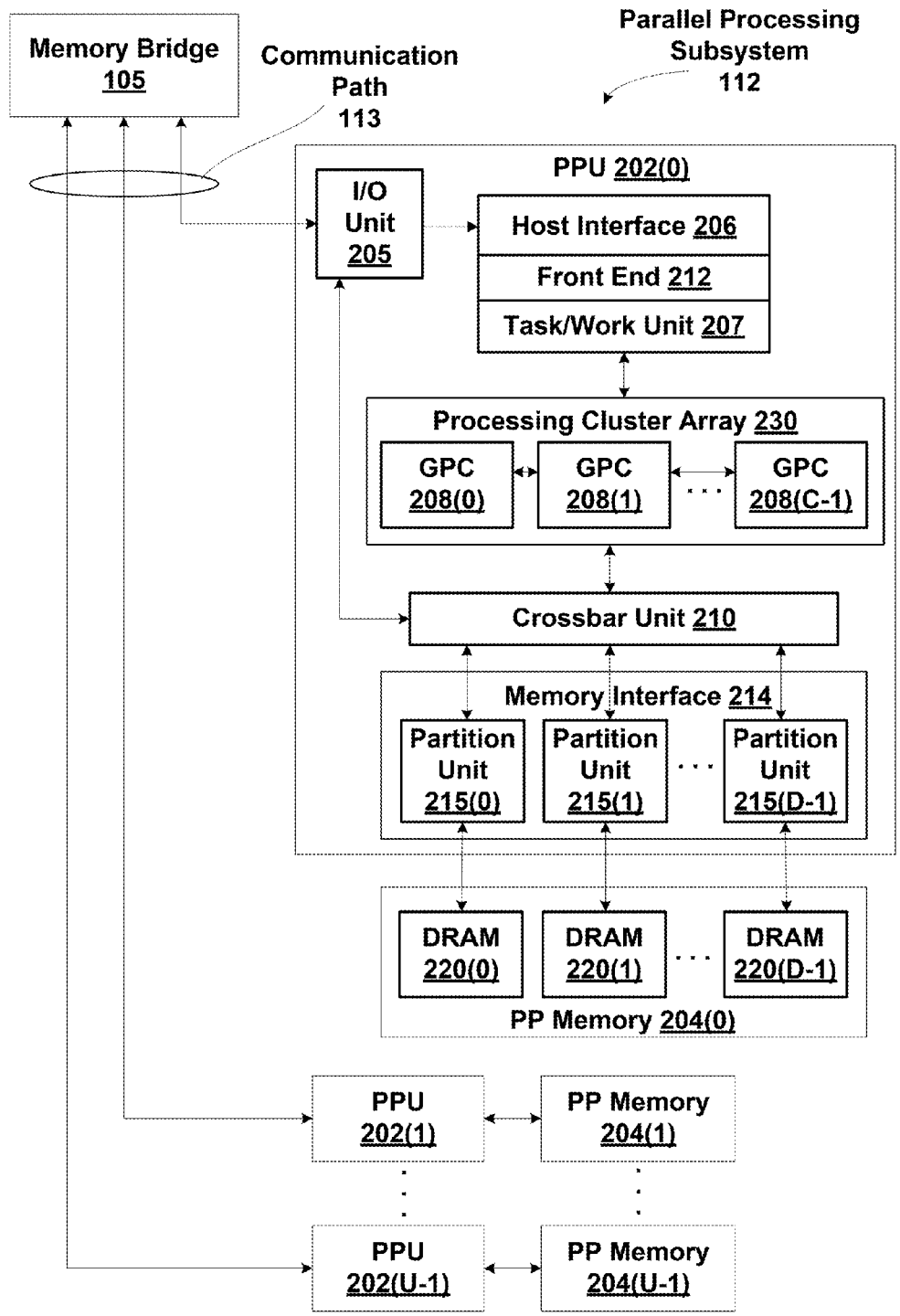
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 in the parallel processing subsystem 112 may output data to display device 110 or each PPU 202 in the parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks (task pointers) that are encoded as task metadata (TMD) and stored in memory. The task pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more dynamic processing tasks during execution. The task/work unit 207 receives the tasks and dynamically schedules the processing tasks and dynamic processing tasks for execution by the GPCs 208.

Figure 3A:
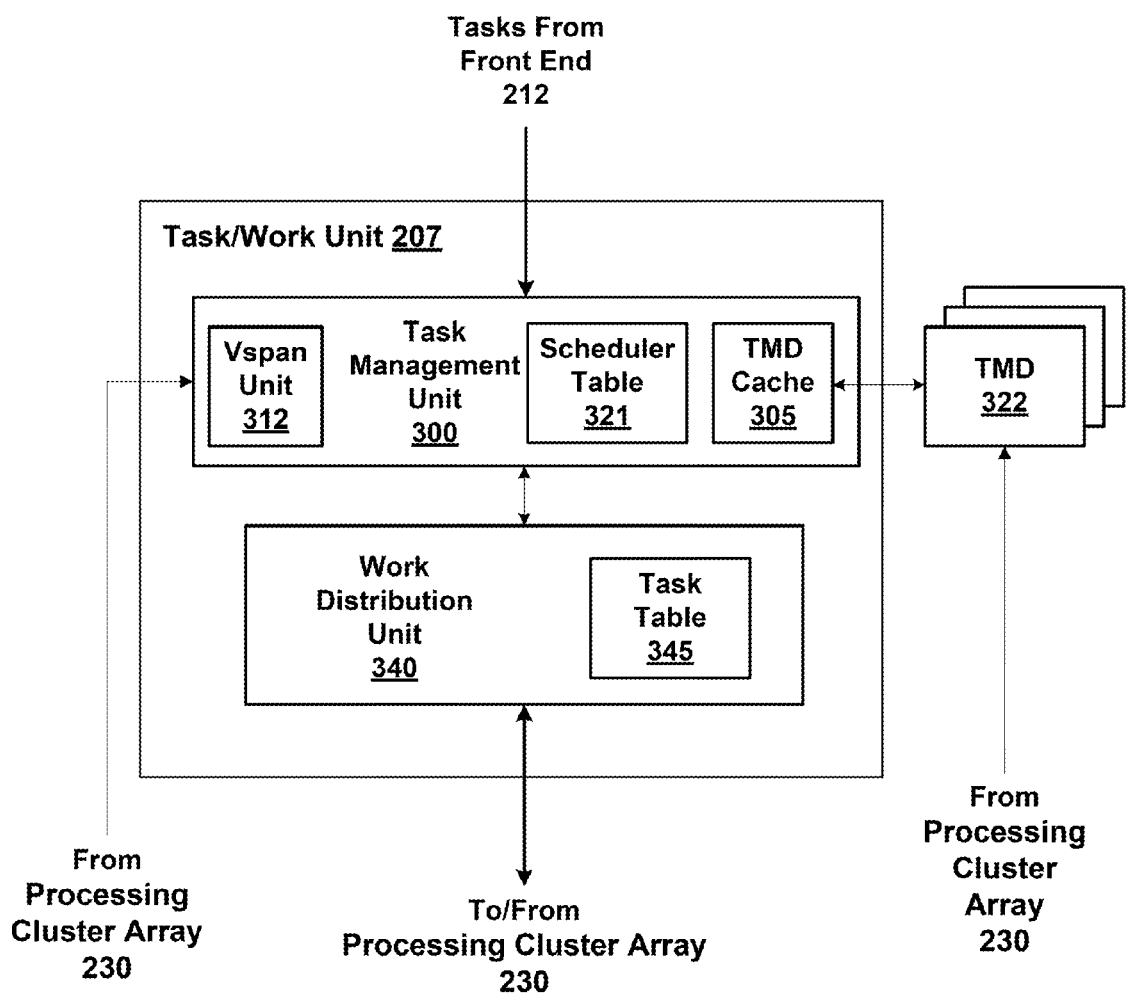
FIG. 3A is a block diagram of the Task/Work Unit of FIG. 2, according to one embodiment of the invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, a pointer to the task is added to a list of task pointers to be scheduled so that execution of the task will resume at a later time. When a dynamic processing task is generated during execution of a task, a pointer to the dynamic task is added to the list of task pointers to be scheduled. A dynamic task may be generated by a TMD 322 executing in the processing cluster array 230.

Unlike a task that is received by the task/work unit 207 from the front end 212, dynamic tasks are received from the processing cluster array 230. Dynamic tasks are not inserted into pushbuffers or transmitted to the front end. The CPU 102 is not notified when a dynamic task is generated or data for the dynamic task is stored in memory. Another difference between the tasks that are provided through pushbuffers and dynamic tasks is that the tasks provided through the pushbuffers are defined by the application program whereas the dynamic tasks are dynamically generated during execution of the tasks.

The task management unit 300 also includes a scheduler table 421 a TMD cache 305 that stores one or more TMDs 322. Each TMD 322 may be a large structure, e.g., 256 Bytes or more, that is typically stored in PP memory 204. Due to the large size, the TMDs 322 are expensive to access in terms of bandwidth. Therefore, the TMD cache 305 stores only the (relatively small) portion of the TMD 322 that is needed by the task management unit 300 for scheduling. The remainder of the TMD 322 may be fetched from PP memory 204 when the task is scheduled, i.e., transferred to the work distribution unit 340.

The TMDs 322 are written under software control, and, when a compute task completes execution, the TMD 322 associated with the completed compute task may be recycled to store information for a different compute task. Because a TMD 322 may be stored in the TMD cache 305, the entries storing information for the completed compute task should be invalidated from the TMD cache 305 before reuse. The invalidation operation is complicated because a race condition exists between the write-back of information stored in the TMD cache 305 to the TMD 322 due to potential in-progress cache line eviction, and the writing of information for the new task to the TMD 322. In particular, the information for the new task is written to the TMD 322 and then the TMD 322 is output to the front end 212 as part of a push buffer. Thus, the device driver 103 that writes the new task does not receive a confirmation that the TMD cache 305 has been invalidated before the device driver 103 begins writing new information. Therefore, the device driver 103 is not able to delay writing of the information for the new task to the TMD 322 until any potential write-back is completed.

Because the write-back resulting from evicting information stored in the TMD cache 305 may overwrite information stored in the TMD 322 for the new task, a "hardware-only" portion of each TMD 322 is set aside for access only by the task management unit 300. The remainder of the TMD 322 may be accessed by software and the task management unit 300. The portion of the TMD 322 that can be accessed by the device driver 103 is typically filled by an application program via the device driver 103 to initiate a task. The TMD 322 is then accessed by the task management unit 300 and other processing units in the GPC 208 during scheduling and execution of the task. When information for a new compute task is written to a TMD 322, the command launching the TMD 322 may specify whether to copy bits into the hardware-only portion of the TMD 322 the first time the TMD 322 is loaded into the TMD cache 305. This ensures that the TMD 322 will correctly only store information for the new compute task since any information for the completed compute task would have only been stored in the hardware-only portion of the TMD 322.

The processing cluster array 230 generates a variety of different signals to perform different operations. In some embodiments, generated signals are converted into reflected notification signals that are transmitted to the task/work unit 207 to perform the different operations without intervention by the CPU 102. A reflected notification signal is generated when a memory management unit (MMU which is shown as MMU 328 in FIG. 3B) receives write request for a queue of a TMD 322. Page table entries of the MMU are configured such that write requests to store data in one or more entries of a queue of a TMD 322 are reflected to the task management unit 300 in the form of reflected notification signals. A portion of the write request encodes the type of reflected notification signal that is generated, e.g., invalidate, schedule, copy, and vspan. In other embodiments, one or more special instructions are used to transmit the notification signals directly to the task/work unit 207. In particular, special instructions may be used to generate the invalidate, schedule, and copy notification signals because these notification signals do not specify the additional information (offset, delta) that is specified by a vspan notification signal.

A first type of reflected notification signal is generated after the processing cluster array 230 completes execution of a task. The first type of reflected notification signal is an invalidate reflected notification signal that is used to invalidate an entry in the TMD cache 305. An invalidate reflected notification signal may be generated when the last thread executing the task exits the program specified by the TMD 322, which is when execution of the TMD 322 is complete. Alternatively, the invalidate reflected notification signal may be generated after the last thread exits but before the entry in the TMD cache 305 is reused.

A second type of reflected notification signal is generated when the processing cluster array 230 enables scheduling of a compute task encoded as a different TMD 322. The second type of reflected notification signal is a schedule reflected notification signal. A third type of reflected notification signal is generated by the processing cluster array 230 when a TMD 322 is first used to control copying of the hardware-only portion of the TMD 322. The third type of reflected notification signal is a copy reflected notification signal. In addition to specifying the type of reflected notification signal (invalidate, schedule, copy), the different reflected notification signals also each specify an identifier corresponding to the TMD 322 that generated the respective reflected notification signal. The type of reflected notification signal may be indicated by particular write addresses that are associated with the invalidate, schedule, and copy operations. A range of reflected addresses may be defined so that write requests to the particular write addresses cause the generation of a reflected notification signals. In one embodiment, because no data is actually needed for the write request that causes the generation of a invalidate reflected notification signal, the schedule reflected notification signal, and the copy reflected notification signal, no data is specified by the write request.

The task management unit 300 also includes a vspan unit 312 that is configured to coalesce data that is dynamically generated and written to a queue of a TMD 322 for a dynamic task. Entries of the queue are allocated in one order and may be filled in a different order. As data is stored in a dynamic TMD 322 by the processing cluster array 230, reflected notification signals that are vpsan reflected notification signals are generated and output to the task management unit 300 indicating the entries of the queue that have been written. Decoupling waiting for data to be written in sequential entries of the queue from writing the queue entries allows TMDs 322 that generate the data to simply write the entries and then exit or continue processing other data.

A vspan reflected notification signal that is generated by a write request to a queue includes information corresponding to the write request. The vspan reflected notification signal specifies a starting entry and length of the data that is written. The vspan reflected notification signal corresponding to a write request does not include the data that is written to the queue. A vspan indicates the set of entries in the queue of a dynamic TMD 322 that are valid, i.e., have been written with data. The data written to the dynamic TMD 322 may be written by the same dynamic TMD 322, a different TMD 322, or a TMD 322 that was not dynamically generated during execution of a TMD 322.

Queue entries are allocated to threads, and each thread writes data to the entries allocated to the respective thread at a later time. Because each thread executes independently, the entries may not be written with data in the same order in which the entries were allocated. In other words, the queue entries may be written "out of order." The vspan unit 312 tracks the vspans provided by the vspan reflected notification signals and coalesces adjacent vspans into sequences of queue entries when possible. The vspan unit 312 then notifies the task management unit 300 when a sequence of queue entries at the front of the queue for the TMD 322 is available to be processed. The pointer to the front of the queue is updated to point to the first unwritten entry when the vspan unit 312 notifies the task management unit 300 that a sequence of queue entries is available to be processed. Because the writing of the entries is decoupled from the notifications that a sequence of queue entries is available to be processed, each thread may write the entries allocated to the respective thread and exit without waiting for other entries in the queue to be written, for the queue entries written by the thread to be read, or for processing of the queue entries written by the thread to be scheduled.

Task Processing Overview

Figure 3B:
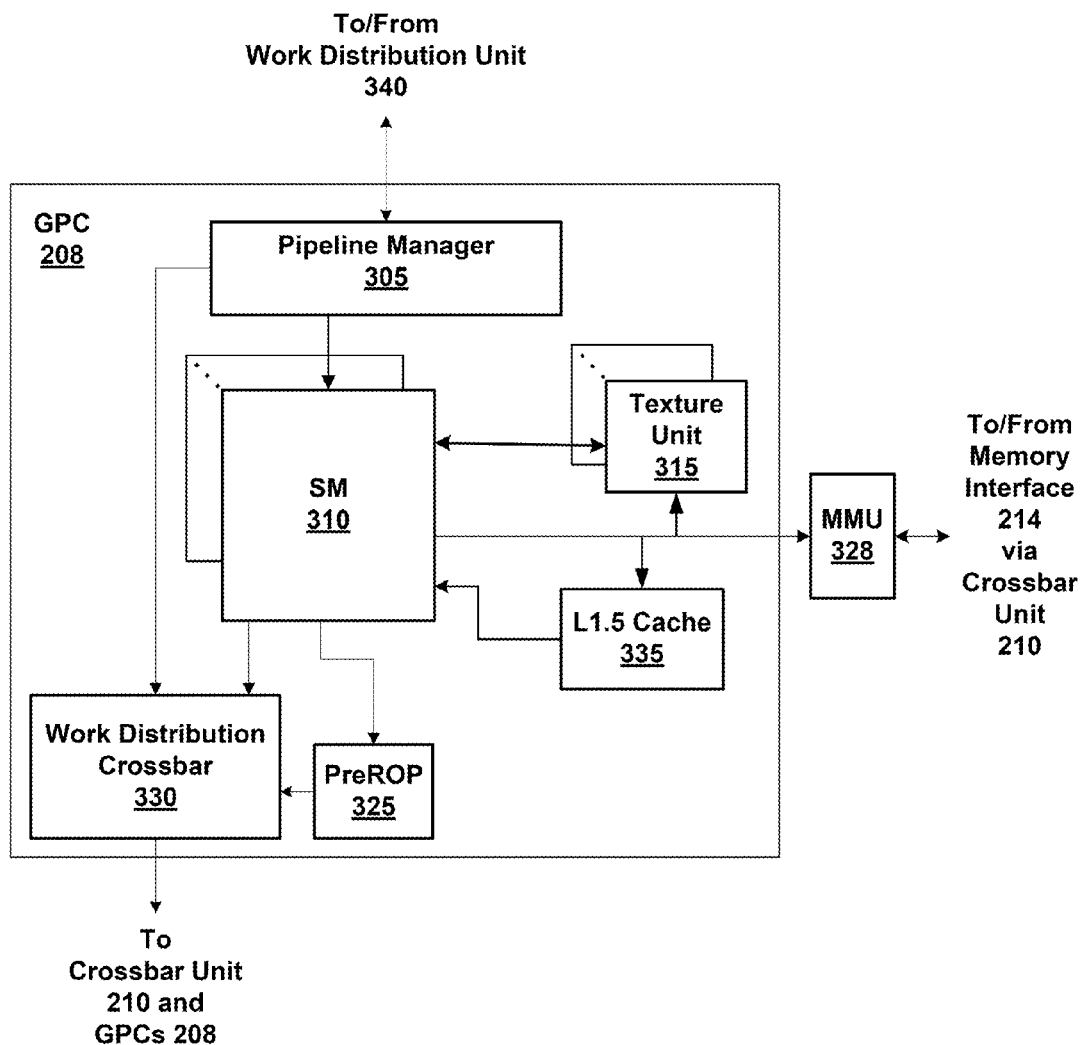
FIG. 3B is a block diagram of a general processing cluster (GPC) of FIG. 2, according to one embodiment of the invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (not shown) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215 shown in FIG. 2. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache that is shared between all of the GPCs 208, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as is shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and the like, to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Task Scheduling and Management

Referring back to FIG. 3A, the task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each TMD in a linked list stores a pointer to the next TMD in the respective linked list. A head pointer and a tail pointer for the linked list are stored for each TMD. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed.

Compute tasks can also be received from the processing cluster array 230 of the PPU 202 shown in FIG. 2. In particular, data generated during execution of a TMD 322 may be written to the queue of a TMD 322 and a reflected notification signal is generated by the MMU 328 in response to each write request to the queue of the TMD 322.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the group in which the selected compute task is stored. Regardless of the scheduling technique, the task management unit 300 is able to quickly select a compute task by selecting the first entry in the linked list of the appropriate group. Therefore, the compute tasks may be scheduled and/or executed in an order that is different than the order in which the task pointers are received by the task management unit 300 from the host interface 206.

Figure 3C:
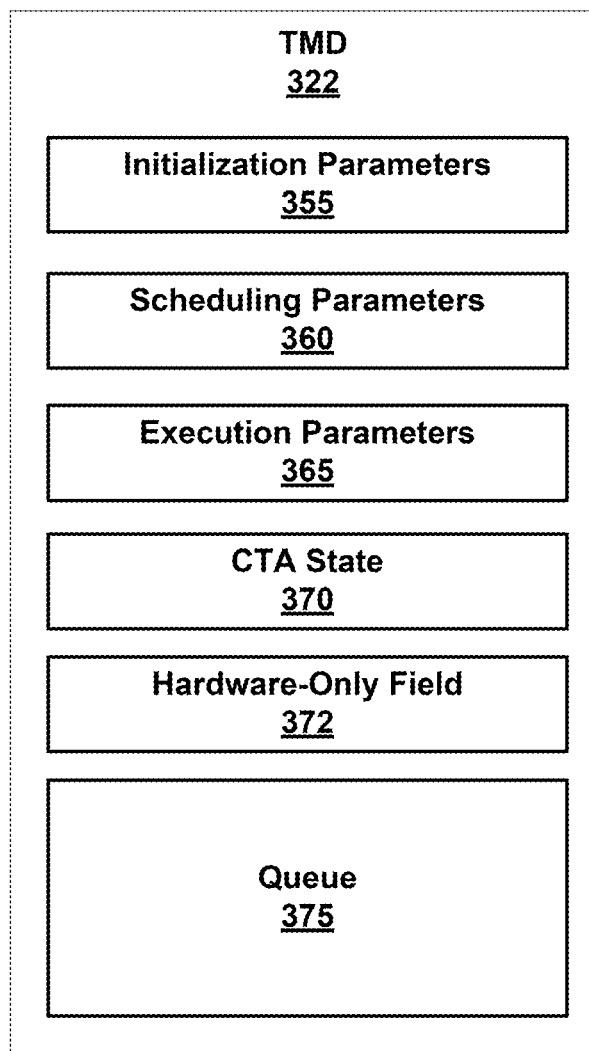
FIG. 3C is a conceptual diagram of the contents of a task metadata (TMD) of FIG. 3A, according to one embodiment of the invention.

FIG. 3C is a conceptual diagram of the contents of a TMD 322 of FIG. 3A that may be stored in PP memory 204, according to one embodiment of the invention. The TMD 322 is configured to store initialization parameters 305, scheduling parameters 360, execution parameters 365, CTA state 370, a hardware-only field 372, and a queue 375. The hardware-only field 372 stores the hardware-only portion of the TMD 322, which comprises one or more hardware-only parameters. Execution state that is common to all TMDs 322 is not included in each TMD 322. Because a TMD 322 is a data structure that is stored in PP memory 204, an application program running on the CPU 102 or PPU 112 can create a TMD 322 structure in memory and then submit the TMD 322 for execution by sending a task pointer for the TMD 322 to the task/work unit 207.

The initialization parameters 355 are used to configure the GPCs 208 when the TMD 322 is launched and may include the starting program address and size of the queue 375. Note that the queue 375 may be stored separately from the TMD 322 in memory in which case the TMD 322 includes a pointer to the queue 375 (queue pointer) in place of the actual queue 375.

The initialization parameters 355 may also include bits to indicate whether various caches, e.g., a texture header cache, a texture sampler cache, a texture data cache, data cache, constant cache, and the like, are invalidated when the TMD 322 is launched. A bit indicating whether texture samplers are linked one-to-one with texture headers may also be included in the initialization parameters 355. Initialization parameters 355 may also include a dimensions of a CTA in threads, a TMD version number, an instruction set version number, dimensions of a grid in terms of CTA width, height, and depth, memory bank mapping parameters, depth of a call stack as seen by an application program, and a size of the call-return stack for the TMD. The initialization parameters 355 may include a size of a constant buffer, an address of the constant buffer, a bit indicating that a constant buffer bind is valid, and a bit indicating that the data from the constant buffer is invalidated in the cache before the TMD is launched may be stored in the initialization parameters 355.

Finally, the initialization parameters 355 may include several parameters related to the amount of memory available for each thread of a CTA. When a TMD 322 needing multiple CTAs that each require large amounts of shared memory are ready to be scheduled for execution, the task/work unit 207 may limit (i.e., throttle) the number of CTAs that execute concurrently so the CTAs do not attempt to consume more memory than is available for access by the TMD 322.

The scheduling parameters 360 control how the task/work unit 207 schedules the TMD 322 for execution. The scheduling parameters 360 may include a bit indicating whether the TMD 322 is a queue TMD or a grid TMD. If the TMD 322 is a grid TMD, then the queue feature of the TMD 322 that allows for additional data to be queued after the TMD 322 is launched is unused, and execution of the TMD 322 causes a fixed number of CTAs to be launched and executed to process the fixed amount of data stored in the queue 375. The number of CTAs is specified as the product of the grid width, height, and depth. The queue 375 is replaced with a queue pointer to the data that will be processed by the CTAs executing the program specified by the TMD 322. The schedule flag for a grid TMD is either set (enabled) when the TMD is created or after the grid TMD is created using a schedule type of reflected notification signal.

If the TMD 322 is a queue TMD, then the queue feature of the TMD 322 is used, meaning that data are stored in the queue 375, as queue entries. Queue entries are input data to CTAs of the TMD 322. The queue entries may also store data for a dynamic task that is generated by another TMD 322 during execution of a thread, thereby providing nested parallelism. Typically, execution of the thread, or CTA that includes the thread, is suspended until execution of the dynamic task completes. The queue 375 may be implemented as a circular queue so that the total amount of data is not limited to the size of the queue 375. As previously described, the queue 375 may be stored separately from the TMD 322 and the TMD 322 may store a queue pointer to the queue 375. Advantageously, queue entries for the dynamic task may be written to the queue 375 while the TMD 322 representing the dynamic task is executing. The schedule flag for a queue TMD is set (enabled) when the queue TMD is created or after the queue TMD is created using a schedule type of reflected notification signal.

A variable number of CTAs are executed for a queue TMD, where the number of CTAs depends on the number of entries written to the queue 375 of the TMD queue. The scheduling parameters 360 for a queue TMD also include the number of entries (N) of queue 375 that are processed by each CTA. When N entries are added to the queue 375, one CTA is launched for the TMD 322. The task/work unit 207 may construct a directed graph of processes, where each process is a TMD 322 with a queue. The number of CTAs to be executed for each TMD 322 may be determined based on the value of N for each TMD 322 and the number of entries that have been written in the queue 375.

Alternate embodiments may have different structures for a grid TMD and a queue TMD, or implement only either grid TMDs or queue TMDs. A TMD 322 may include a task pointer to a dependent TMD that is automatically launched when the TMD 322 completes. Semaphores may be executed by the TMDs 322 to ensure that dependencies between the different TMDs 322 and the CPU 102 are met. For example, the execution of a first TMD 322 may depend on a second TMD completing, so the second TMD generates a semaphore release, and the first TMD executes after the corresponding semaphore acquire succeeds. In some embodiments, the semaphore acquire is performed in the host interface 206 or the front end 212. The execution parameters 365 for a TMD 322 may store a plurality of semaphore releases, including the type of memory barrier, address of the semaphore data structure in memory, size of the semaphore data structure, payload, and enable, type, and format of a reduction operation. The data structure of the semaphore may be stored in the execution parameters 365 or may be stored outside of the TMD 322.

The scheduling parameters 360 of the TMD 322 may include a bit that is set when the TMD 322 is created which causes TMD fields to be copied to the hardware-only field 372 when the TMD 322 is first loaded by the task management unit 300. The scheduling parameters 360 may also include the TMD group ID, a bit to indicate where the TMD 322 is added to a linked list (head or tail), and a pointer to the next TMD 322 in the TMD group. The scheduling parameters 360 may also include masks that enable/disable specific streaming multiprocessors within the GPCs 208.

The execution parameters 365 may also include the starting address of the program to be executed for the TMD 322, the type of memory barrier operation that is performed when execution of the TMD 322 completes, a serial execution flag indicating whether only a single CTA is executed at a time (serially) for the TMD 322, and a throttle enable flag that controls whether or not the task/work unit 207 may limit the number of CTAs running concurrently based on the memory limitations specified for the TMD 322.

When a process is preempted, processing of the TMD 322 may be stopped at an instruction boundary or a CTA boundary and identification of the CTA at which processing will be resumed is stored in the CTA state 370. The state information needed to resume execution of the TMD 322 after preemption may be stored in the CTA state 370, or in a separate area in PP memory 204, or in system memory 104.

The CTA state 370 also stores data pointers to entries of the queue 375 and counter overflow flags indicating when each data pointer increments past the end of the queue 375 and needs to wrap back to the start of the queue 375. Hardware-only versions of one or more of the data pointers and the scheduling flag may be stored in the hardware-only field 372.

Figure 3D:
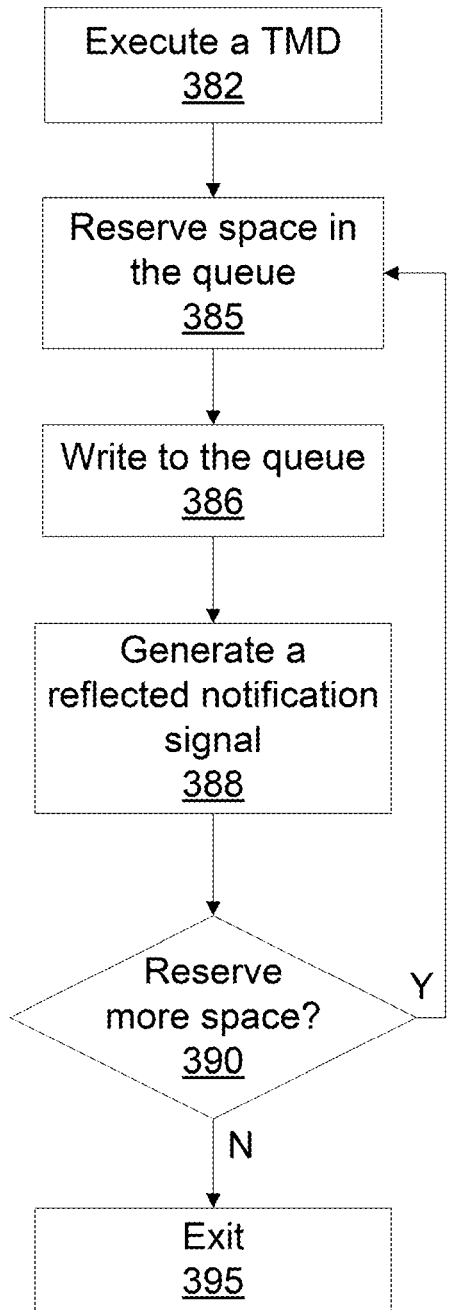
FIG. 3D illustrates a flowchart for a method for writing to a queue when a child task is generated, according to one embodiment of the invention.

FIG. 3D illustrates a flowchart for a method 380 for writing to a queue 375, according to one embodiment of the invention. Although the method steps are described in conjunction with the systems of FIGS. 1, 2, 3A, and 3B, persons skilled in the art will understand that any system configured to perform the method steps, in any order, is within the scope of the inventions. A "producer" compute task encoded by a TMD 322 allocates space in the queue 375 and then writes data to the allocated space. A "consumer" compute task eventually reads the data that was written by the "producer" compute task. A single compute task may generate one or more dynamic tasks and/or write data to a queue 375. Data may be written to a queue 375 for a generated dynamic task or for an existing compute or dynamic task.

At step 382, a compute task encoded by a TMD 322 is executed in the processing cluster array 230 by one or more CTAs launched by the task/work unit 207. At step 385 one or more threads reserve space in the queue 375 to store data that will be read by the dynamic task. Entries in the queue 375 are allocated, to the threads executing a task that generates data for a dynamic task, using an atomic operation in the order in which the allocation requests are processed. An atomic operation is used so that only one thread is allocated a particular entry in the queue. In other words, so that no entry in the thread is allocated to two or more threads when allocation requests are received simultaneously. As previously described, the threads do not necessarily store data in the entries in the order in which the entries were allocated. Therefore, the vspan unit 312 coalesces multiple vspans in the queue 375 into larger contiguous vspans, as possible, when each vspan reflected notification signal is received. The vspan unit 312 notifies the task management unit 300 when entries of the queue store data are available to be scheduled for processing.

At step 386 one or more threads that allocated entries in the queue 375 output write requests to store data in the entries. At step 388 a vspan reflected notification signal is generated for each write request and the vspan reflected notification signal is transmitted to the vspan unit 312. At step 390 the one or more threads executing the compute task determine if any new dynamic tasks will be generated that will require additional space in the queue or if a dynamic task already generated will need additional entries in the queue 375, and, if so, the one or more threads return to step 385. Otherwise, at step 395 the last thread executing the TMD 322 exits and execution of the compute task encoded by the TMD 322 is complete.

Figure 4:
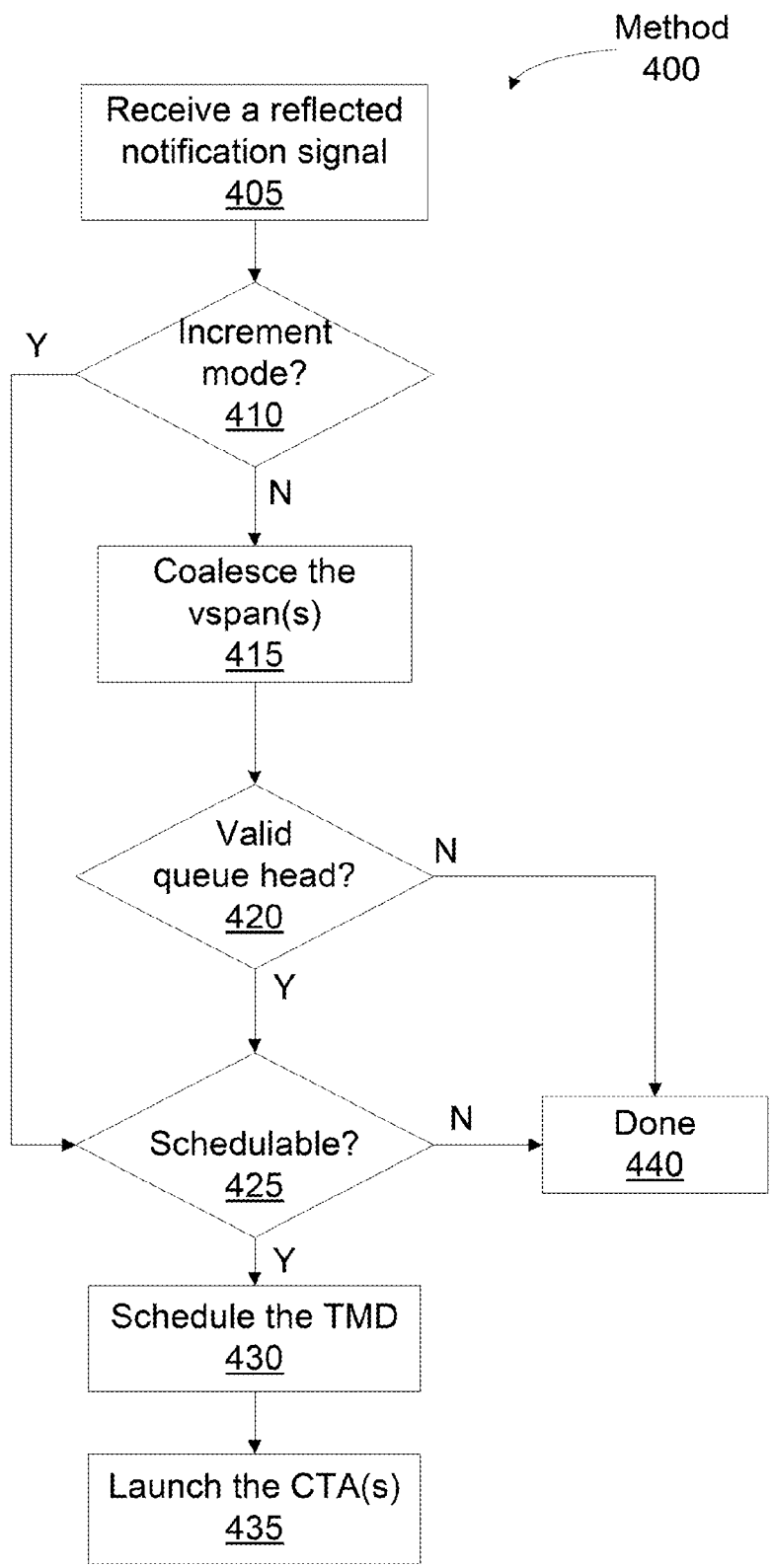
FIG. 4 illustrates a flowchart for a method for processing a vspan reflected notification signal, according to one embodiment of the invention.

FIG. 4 illustrates a flowchart for a method 400 for processing a vspan reflected notification signal, according to one embodiment of the invention. Although the method steps are described in conjunction with the systems of FIGS. 1, 2, 3A, and 3B, persons skilled in the art will understand that any system configured to perform the method steps, in any order, is within the scope of the inventions.

At step 405 the task/work unit 207 receives a vspan reflected notification signal from the processing cluster array 230. At step 410 the vspan unit 312 determines if an increment mode is specified for the TMD 322, and, if so, the vspan unit 312 proceeds directly to step 425 to determine if the TMD 322 is schedulable. The increment mode is used when the vspan reflected write notifications may be processed in any order. Therefore, coalescing of vspans is not performed by the vspan unit 312. In one embodiment the increment mode may be enabled or disabled using a notification signal that is transmitted from the processing cluster array 230 to the task management unit 300.

If, at step 410 the vspan unit 312 determines that the increment mode is not specified for the TMD 322, then at step 415 the vspan unit 312 attempts to coalesce the new vspan specified by the vspan reflected notification signal with one or more other vspans. The coalescing process is described in further detail in conjunction with FIGS. 5 and 6.

At step 420 the vspan unit 312 determines if the entry of the queue 375 pointed to by an inner put pointer has been written, and, if not, at step 440 processing of the vspan reflected notification signal is done. The inner put pointer indicates the first entry of the queue 375 that has been written and not yet provided to the task management unit 300 for scheduling. Otherwise, at step 425 the vspan unit 312 determines if a sequence of at least one entry of the queue 375 is schedulable for execution. The TMD 322 may be configured using a schedule flag to be scheduled only when the schedule flag is set, regardless of whether or not the entry of the queue 375 pointed to by the inner put pointer has been written or whether or not the increment mode is used for the TMD 322. The scheduling flag is set when a scheduling type of reflected notification signal is received by the task management unit 300 from the processing cluster array 230.

If, at step 425, the vspan unit 312 determines that the queue 375 is not schedulable, then at step 440 processing of the vspan reflected notification signal is done. Otherwise, at step 430 the task management unit 300 is informed that entries of the queue 375 are written and the task management unit 300 schedules the TMD 322 for processing by one or more CTAs. At step 435 the work distribution unit 340 launches the one or more CTAs to execute the TMD 322. In this manner, processing of the data in the queue 375 is initiated in the allocation order as sequences of the data are written to the queue 375 by one or more concurrently executing threads.

Tracking Writing of Task Data for Scheduling of Processing Tasks

Figure 5:
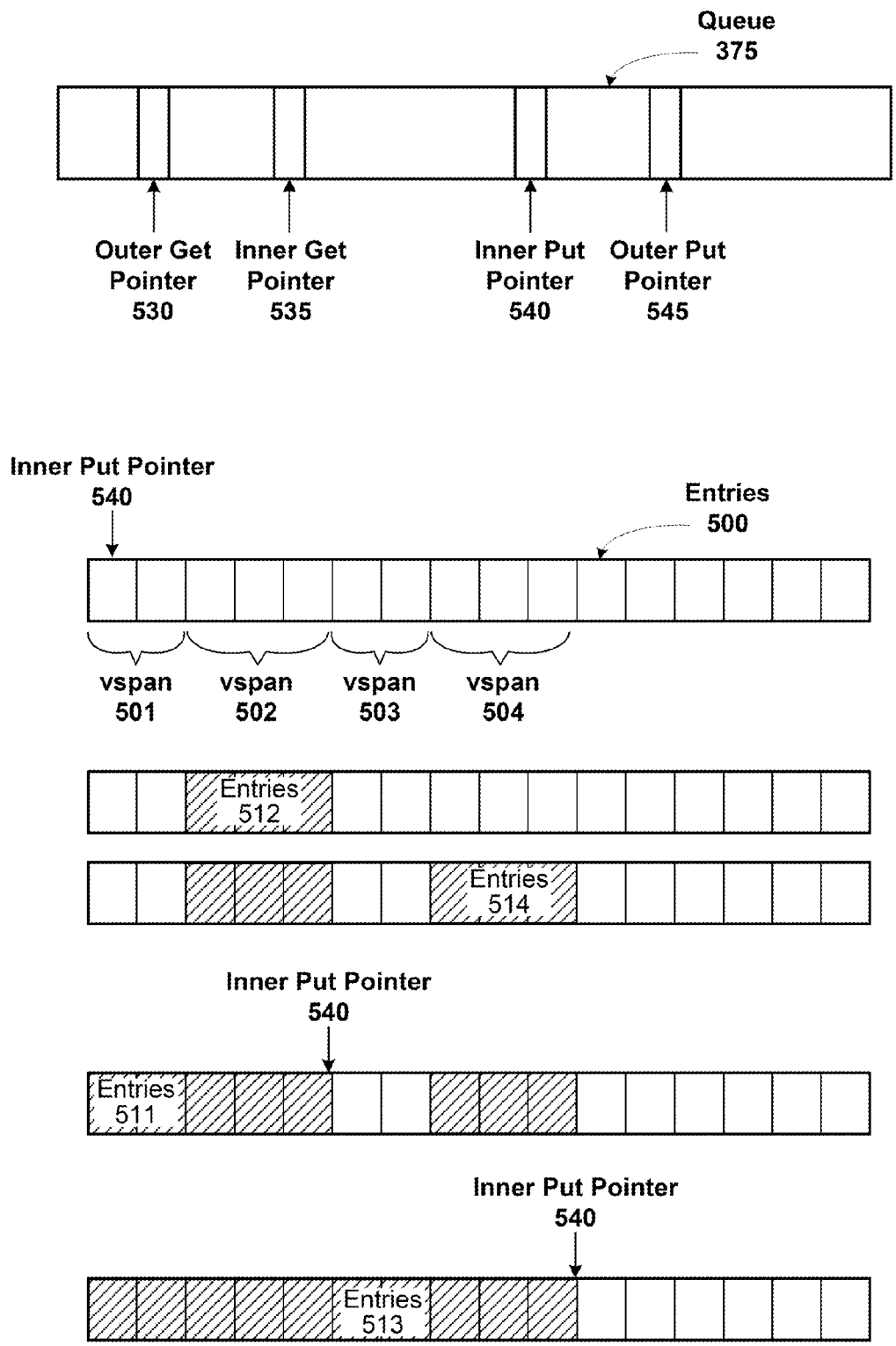
FIG. 5 is a conceptual diagram of the contents of the queue of FIG. 3C as vspans are coalesced, according to one embodiment of the invention.

FIG. 5 is a conceptual diagram of the contents of the queue 375 of FIG. 3C as vspans are coalesced, according to one embodiment of the invention. As previously explained, writing data for a processing task encoded in the queue 375 is decoupled from the allocation of entries in the queue 375. An outer put pointer 545 points to the next available entry in the queue 375 to be allocated and an inner put pointer 540 points to the oldest entry in the queue 375 that has been allocated and not yet written. When data is written in the entry pointed to by the inner put pointer 540, the inner put pointer 540 is advanced towards the outer put pointer 545 and the vspan unit 312 indicates that data is ready to be scheduled for processing. Because the entries are not necessarily written in the order in which the entries are allocated, so there may be one or more entries between the inner put pointer 540 and the outer put pointer 545 that have been written (other than the entry pointed to by the inner put pointer 540).

An outer get pointer 530 points to the oldest entry of the queue 375 that stores data that has been assigned to a CTA for processing, i.e., a CTA that will process the data has been launched but the CTA has not read the data yet. An inner get pointer 535 points to the newest entry of the queue 375 that has been assigned to a CTA for processing. Data that have been written to the queue 375, but not yet assigned to a CTA for processing are stored in the entries between the inner get pointer 535 and the inner put pointer 540. Data that have been assigned to a CTA for processing and not read are stored between the outer get pointer 530 and the inner get pointer 535.

Four vspans, vspan 501, 502, 503, and 504 are each associated with a portion of entries 500 in the queue 375. The vspans 501-504 are the vspan reflected notification signals that are generated when the entries of entries 500 associated with each respective vspan are written. Each vspan is represented by an offset representing a starting entry location in the queue 375 and a delta value that indicates the number of entries in the queue 375 written by a write request for which the vspan reflected notification signal is generated. In one embodiment, the delta value equals an end value, i.e., delta value=offset+number of entries written. As vspan reflected notification signals are received, the vspan unit 312 attempts to coalesce the new vspan with an existing vspan. The existing vspans are stored in a linked list based on the starting entry location and delta values of the vspans so that the vspans are in the same order that the entries of the queue 375 were allocated in for storing the data.

When a new vspan cannot be coalesced with an existing vspan that is stored in the linked list, memory needed to store the new vspan is allocated from a pool of unused vspan memory blocks. The pool is shared between all of the queue TMDs 322. A separate linked list of vspans is stored and tracked for each queue TMD 322. When a new vspan is coalesced with an existing vspan, the existing vspan's delta value and/or offset values are updated. As new and existing vspans are coalesced, memory blocks that stored existing vpans that are no longer needed in the linked list for a queue TMD 322 are released to the shared pool.

The data associated with vspan 502 is written by a first write request before the data associated with vspans 501, 503, and 504 is written. The data associated with vspan 502 fills entries 512 that are three entries of the queue 375. The offset and delta for the vspan 502 is 2 and 3, respectively, and a vspan memory block is allocated from the shared pool to store vspan 502. The vspan 502 is generated and included in a first vspan reflected notification signal in response to the first write request.

The data associated with vspan 504 is written second, by a second write request, filling entries 514 that are three more entries of the queue 375. The vspan 504 is generated and included in a second vspan reflected notification signal in response to the second write request. The offset and delta for the vspan 504 is 7 and 3, respectively. The vspans 502 and 504 cannot be coalesced because data associated with vspan 503 is not written yet, so an additional vspan memory block is allocated from the shared pool to store vspan 504.

The data associated with vspan 501 is written third, by a third write request, filling entries 511 that are the first two entries of the queue 375. The vspan 501 is generated and included in a third vspan reflected notification signal in response to the third write request. The offset and delta for the vspan 501 is 0 and 2, respectively. The vspan 501 may be coalesced with the vspan 502, so the delta for vspan 502 is changed from 3 to 5 and the offset is changed to 0. The inner put pointer 540 is advanced to point to the first entry of the unwritten vspan 503. At this point the compute task encoded by the TMD 322 can be scheduled to run for entries 511 and 512. When the inner put pointer 540 is advanced, the vspan memory block that stored vspan 502 is released to the shared pool.

Finally, the data associated with vspan 503 is written by a fourth write request, filling entries 513 that are two more entries of the queue 375. The vspan 503 is generated and included in a fourth vspan reflected notification signal in response to the fourth write request. The offset and delta for the vspan 503 is 5 and 2, respectively. The vspan 503 is coalesced with the vspan 504, so the delta for vspan 504 is changed from 3 to 5 and the offset is changed to 5. The inner put pointer 540 is advanced to point to the first entry after vspan 504. At this point the compute task encoded by the TMD 322 can be scheduled to run for entries 513 and 514. When the inner put pointer 540 is advanced the vspan memory block storing vspan 504 is released to the shared pool.

Figure 6:
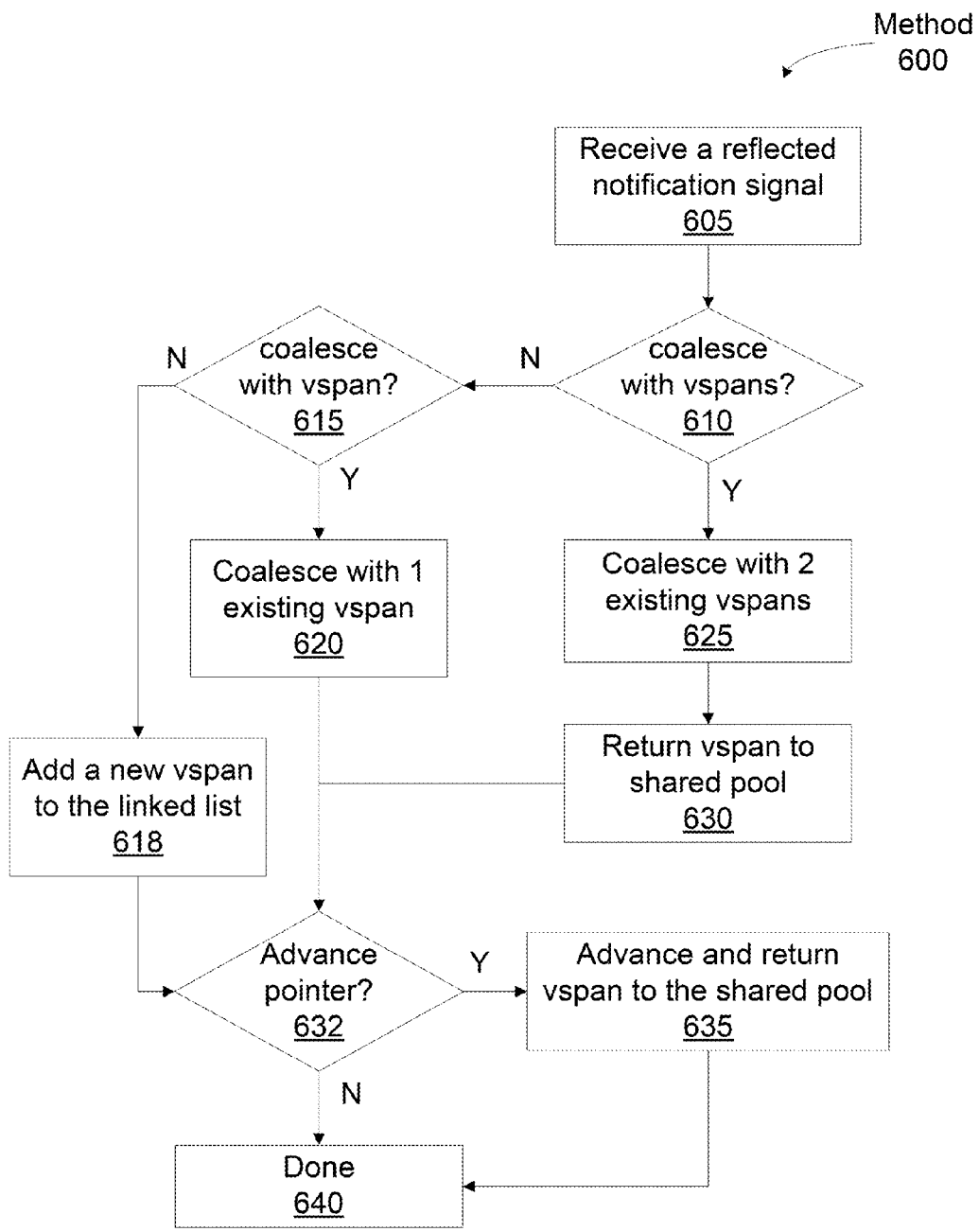
FIG. 6 illustrates a flowchart for a method for coalescing vspans, according to one embodiment of the invention.

FIG. 6 illustrates a flowchart for a method 600 of processing a vspan reflected notification signal and coalescing vspans, according to one embodiment of the invention. Although the method steps are described in conjunction with the systems of FIGS. 1, 2, 3A, and 3B, persons skilled in the art will understand that any system configured to perform the method steps, in any order, is within the scope of the inventions.

At step 605 the vspan unit 312 receives a vspan reflected notification signal when data is written to one or more entries of the queue 375. At step 610 the vspan unit 312 determines if the vspan specified by the vspan reflected notification signal is between two vspans and can be coalesced with the two vspans in the linked list for the TMD 322, and, if so, then at step 625 the vspan unit 312 coalesces the new vspan with the two vspans in the linked list. At step 630 the vspan unit 312 returns one vspan to the shared pool before proceeding to step 632.

If, at step 610 the vspan unit 312 determines that the vspan specified by the vspan reflected notification signal is cannot be coalesced with two vspans in the linked list for the TMD 322, then the vspan unit 312 determines if the vspan specified by the vspan reflected notification signal can be coalesced with one vspan in the linked list for the TMD 322, and, if so, then at step 620 the vspan unit 312 coalesces the newly written vspan with one vspan and proceeds to step 632. Otherwise, at step 618 the vspan unit 312 allocates a vspan from the shared pool to store the new vpan and inserts the allocated vspan into the linked list and proceeds to step 632.

At step 632 the vspan unit 312 determines if the inner put pointer 540 can be advanced, and, if not, then at step 640 processing of the vspan reflected notification signal is complete. Otherwise, at step 635 the vspan unit 312 advances the inner put pointer 540 and returns the vspan at the head of the linked list to the shared pool. At step 640 processing of the vspan reflected notification signal is complete.

Figure 7:
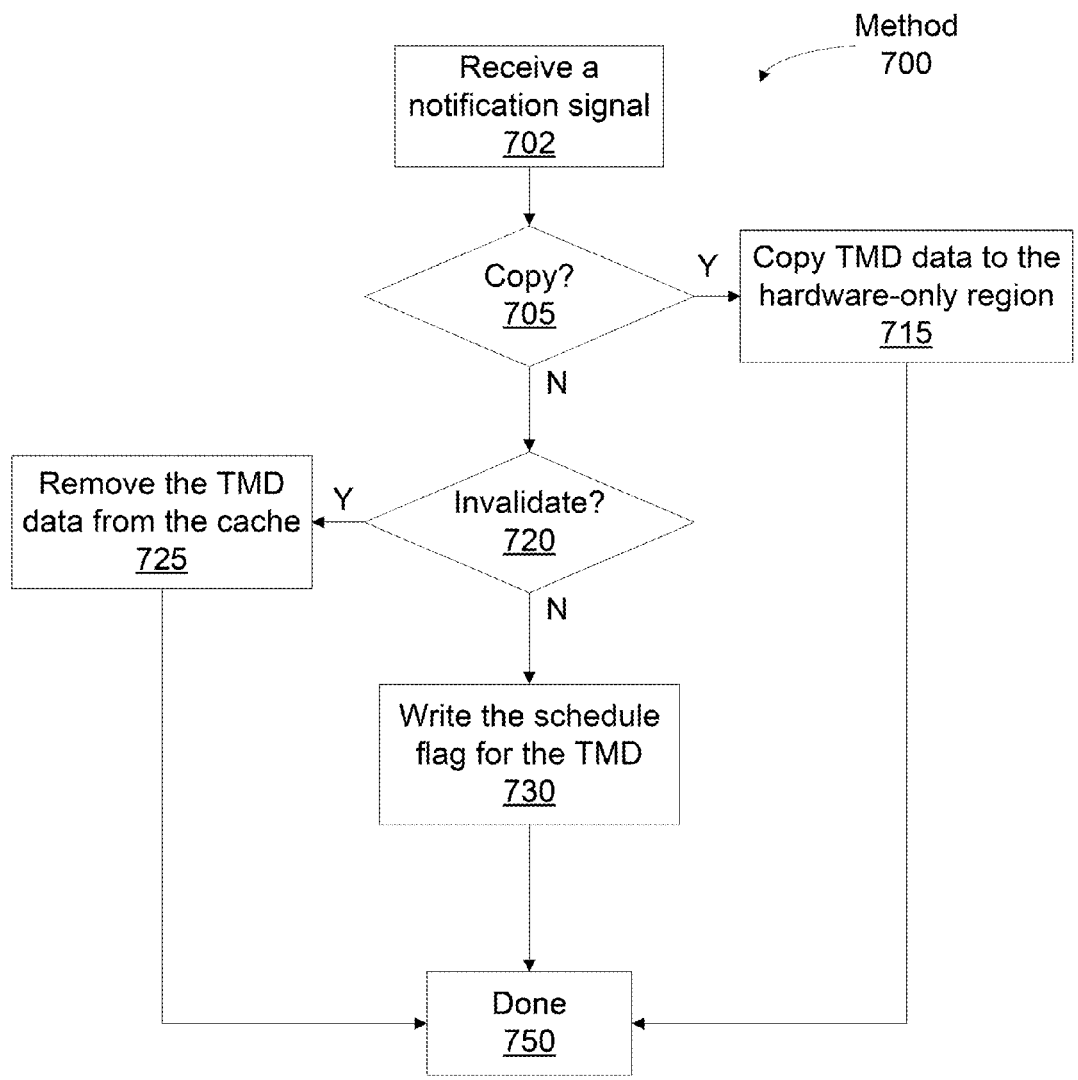
FIG. 7 illustrates a method for processing a reflected notification signal, according to one embodiment of the invention.

FIG. 7 illustrates a flowchart for a method processing a reflected notification signal that is not a vspan reflected notification signal, according to one embodiment of the invention. Although the method steps are described in conjunction with the systems of FIGS. 1, 2, 3A, 3B, and 3C, persons skilled in the art will understand that any system configured to perform the method steps, in any order, is within the scope of the inventions.

At step 702 the task management unit 300 receives a reflected notification signal from the processing cluster array 230. At step 705 the task management unit 300 determines if the notification signal is a copy reflected notification signal, and, if so, then at step 715 a portion of the TMD 322 is copied into the hardware-only field 372 of the TMD 322. At step 750 processing of the reflected notification signal is complete.

If, at step 705 the task management unit 300 determines that the reflected notification signal is not a copy reflected notification signal, then at step 720 the task management unit 300 determines if the reflected notification signal is an invalidate reflected notification signal. If the reflected notification signal is an invalidate reflected notification signal, then at step 725, if the data is present in the TMD cache 305, the task management unit 300 removes the TMD 322 data from the TMD cache 305. Any dirty cache lines storing TMD 322 data that is removed from the TMD cache 305 are not written to memory. The TMD 322 may then be reused for a different compute task.

If, at step 720 the task management unit 300 determines that the reflected notification signal is not an invalidate reflected notification signal, then the reflected notification signal is a schedule signal that sets the schedule flag for a TMD 322. The schedule flag is used by the task management unit 300 to determine whether a sequence of at least one entry of the queue 375 is schedulable for execution. At step 730 the schedule flag for the TMD 322 is set when the schedule flag is written. At step 750 processing of the reflected notification signal is done.

The dynamic compute tasks that are dynamically generated during execution of a compute task encoded by a TMD 322 may be inserted directly into the scheduling pipeline of a PPU 202 without intervention by the CPU 102, when the task/work unit 207 receives a notification signal from a GPC 208. A mechanism generates a vspan reflected notification signal when data is queued for the dynamic compute task and generates additional notification signals for other events, e.g., initiating loading the TMD cache 305, invalidating cache entries storing data for a compute task, and enabling scheduling of a compute task. Additionally, entries storing data for a compute task queue may be written out of order. Therefore, when data that is dynamically generated is written to the queue, portions of the data are coalesced and the task/work unit 207 is notified when a sequence of entries are ready to be scheduled for processing to begin or continue execution of a compute task. Decoupling the waiting for data to be written in sequential entries of the queue from writing the queue entries allows the threads that generate the data to simply write the entries and then exit or continue processing other data.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of notifying a task manager that data is available for processing, the method comprising:
generating a first notification signal that is transmitted to the task manager, wherein the notification signal specifies a first offset and a first delta value;
storing first data in one or more entries indicated by the first offset and the first delta value in a queue corresponding to a first processing task;
generating a second notification signal that is transmitted to the task manager, wherein the notification signal comprises a second offset and a second delta value;
storing second data in one or more entries indicated by the second offset and the second delta value in the queue corresponding to the first processing task;
receiving the first notification signal and a second notification signal;
determining if the first offset and the first delta value can be coalesced with the second offset and the second delta value, and, if so, generating a coalesced offset and a coalesced delta value; and
scheduling, by the task manager, processing of at least one of the first data and the second data for the first processing task in a processing cluster array.

2. The method of claim 1, further comprising inserting the first offset, the first delta value, the second offset, and the second delta value into a linked list in an order based on the first offset and the second offset when the first offset and the first delta value cannot be coalesced with the second offset and the second delta.

3. The method of claim 2, further comprising:
advancing a pointer to a head of the queue when the pointer points to an entry of the queue that stores at least a portion of the first data; and
removing the first offset and the first delta value from the linked list.

4. The method of claim 1, further comprising:
transmitting a first write request including first data for the first processing task to a memory address;
detecting the memory address is in a range of reflected addresses; and
reflecting the first write request directly to the task manager as the first notification signal.

5. The method of claim 4, further comprising:
allocating, in a first order, first entries in the queue for storing the first data and second entries in the queue for storing second data;
transmitting a second write request including the second data for the processing task to the memory; and
processing the second write request to store the second data for the processing task in the memory, wherein the first write request and the second write request are processed in a second order that is different compared with the first order.

6. The method of claim 1, further comprising executing an instruction that specifies the first offset and a first delta value, wherein execution of the instruction causes the generating of the first notification signal.

7. The method of claim 1, further comprising generating a third notification signal that is transmitted directly to the task manager, wherein the third notification signal is configured to copy data from a first portion of the task metadata structure to a second portion of the task metadata structure.

8. The method of claim 1, further comprising generating a third notification signal that is transmitted directly to the task manager, wherein the third notification signal is configured to invalidate entries in a cache storing data of a task metadata structure that encodes the processing task.

9. The method of claim 1, further comprising generating a third notification signal that is transmitted directly to the task manager, wherein the third notification signal is configured to write a flag that controls whether the processing task is scheduled for execution.

10. The method of claim 1, wherein the processing task is a dynamic processing task and the first data is generated by a different processing task.

11. A system for notifying a task manager that data is available for processing, the system comprising:
a queue corresponding to a first processing task and that is configured to store the data, including first data and second data;
a memory management unit that is configured to:
generate a first notification signal that is transmitted directly to the task manager, wherein the notification signal specifies a first offset and a first delta value for storing the first data; and
generate a second notification signal that is transmitted directly to the task manager, wherein the notification signal specifies a second offset and a second delta value for storing the second data; and
the task manager that is configured to:
receive the first notification signal and the second notification signal;
determine if the first offset and the first delta value can be coalesced with the second offset and the second delta value, and, if so, generate a coalesced offset and a coalesced delta value; and
schedule processing of at least one of the first data and the second data for the first processing task in a processing cluster array.

12. The system of claim 11, wherein the task manager is further configured to: insert the first offset, the first delta value, the second offset, and the second delta value into a linked list in an order based on the first offset and the second offset when the first offset and the first delta value for the first reflected notification signal cannot be coalesced with the second offset and the second delta.

13. The system of claim 12, wherein the task manager is further configured to:
advance a pointer to a head of the queue when the pointer points to an entry of the queue that stores at least a portion of the first data; and
remove the first offset and the first delta value from the linked list.

14. The system of claim 11, wherein the memory management unit is further configured to:
receive a first write request to a memory address including first data for the first processing task;
detect the memory address is in a range of reflected addresses; and
reflect the first write request directly to the task manager as the first notification signal.

15. The system of claim 11, wherein the processing cluster array is further configured to:
allocate, in a first order, first entries in the queue for storing the first data and second entries in the queue for storing second data; and
transmit a second write request including the second data for the processing task to the memory, and
the memory management unit is further configured to process the second write request to store the second data for the processing task in the memory, wherein the first write request and the second write request are processed in a second order that is different compared with the first order.

16. The system of claim 11, wherein the processing cluster array is further configured to generate a third notification signal that is transmitted directly to the task manager, and the third notification signal is configured to copy data from a first portion of the task metadata structure to a second portion of the task metadata structure.

17. The system of claim 11, wherein the multi-threaded processor is further configured to generate a third notification signal that is transmitted directly to the task manager, and the third notification signal is configured to invalidate entries in a cache storing data of a task metadata structure that encodes the processing task.

18. The system of claim 11, wherein the multi-threaded processor is further configured to generate a third notification signal that is transmitted directly to the task manager, and the third notification signal is configured to write a flag that controls whether the processing task is scheduled for execution.

19. A computing device, comprising:
a memory; and
a parallel processing unit coupled to the memory and including:
  a queue corresponding to a first processing task and that is configured to store the data, including first data and second data;
  a memory management unit that is configured to:
    generate a first notification signal that is transmitted directly to the task manager, wherein the notification signal specifies a first offset and a first delta value for storing the first data; and
    generate a second notification signal that is transmitted directly to the task manager, wherein the notification signal specifies a second offset and a second delta value for storing the second data; and
  a task manager that is configured to:
    receive the first notification signal and the second notification signal;
    determine if the first offset and the first delta value can be coalesced with the second offset and the second delta value, and, if so, generate a coalesced offset and a coalesced delta value; and
    schedule processing of at least one of the first data and the second data for the first processing task in a processing cluster array.

\* \* \* \* \*